United States Patent
Rahman et al.

(10) Patent No.: US 11,589,328 B2
(45) Date of Patent: Feb. 21, 2023

(54) SYSTEMS AND METHODS FOR NETWORK CATEGORIZATION

(71) Applicant: T-Mobile USA, Inc., Bellevue, WA (US)

(72) Inventors: Muhammad Tawhidur Rahman, Bellevue, WA (US); A. Karl Corona, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/523,708

(22) Filed: Jul. 26, 2019

(65) Prior Publication Data
US 2021/0029659 A1    Jan. 28, 2021

(51) Int. Cl.
| H04W 84/04 | (2009.01) |
|---|---|
| H04W 60/00 | (2009.01) |
| H04W 8/24 | (2009.01) |
| H04W 80/04 | (2009.01) |
| H04W 80/10 | (2009.01) |

(52) U.S. Cl.
CPC ............ *H04W 60/00* (2013.01); *H04W 8/24* (2013.01); *H04W 80/04* (2013.01); *H04W 80/10* (2013.01); *H04W 84/042* (2013.01)

(58) Field of Classification Search
CPC ....... H04W 60/00; H04W 8/24; H04W 80/10; H04W 84/042; H04W 80/04
See application file for complete search history.

(56) References Cited

U.S. PATENT DOCUMENTS

| 8,594,105 | B1* | 11/2013 | Breau | H04L 65/1016 |
|---|---|---|---|---|
| | | | | 370/401 |
| 2008/0089308 | A1* | 4/2008 | Jentz | H04W 36/0033 |
| | | | | 370/342 |
| 2011/0090903 | A1 | 4/2011 | Jonsson et al. | |
| 2011/0286389 | A1* | 11/2011 | Atarius | H04W 8/183 |
| | | | | 370/328 |
| 2013/0024574 | A1* | 1/2013 | Lau | H04L 65/1069 |
| | | | | 709/227 |
| 2015/0195309 | A1* | 7/2015 | Opsenica | H04L 67/141 |
| | | | | 709/228 |
| 2017/0149903 | A1* | 5/2017 | Zhou | H04L 65/1006 |
| 2018/0279218 | A1* | 9/2018 | Park | H04W 36/08 |

(Continued)

FOREIGN PATENT DOCUMENTS

WO    WO2017157441 A1    9/2017

OTHER PUBLICATIONS

3GPP TR23.973 V0. 0.2 (Apr. 2019) (Year: 2019).*

(Continued)

*Primary Examiner* — Joseph E Dean, Jr.
(74) *Attorney, Agent, or Firm* — Lee & Hayes, P.C.

(57) ABSTRACT

Systems and methods for categorizing communication data are described herein. The systems and methods enable an IMS core network to register a user equipment as a 5G-capable device and store communication data in a manner that differentiates the communication data from non-5G devices. Once identified as a 5G-capable device and information that 5G coverage is available is received, the registration message from the user equipment to the IMS core is modified to configure the IMS core to store the communication data as 5G communication data rather than non-5G communication data.

20 Claims, 4 Drawing Sheets

(56) References Cited

U.S. PATENT DOCUMENTS

2018/0352489 A1* 12/2018 Anchan .............. H04W 36/245
2019/0059024 A1*  2/2019 Mufti ................. H04L 65/1069
2019/0069325 A1*  2/2019 Yerramalli ........... H04W 52/38

OTHER PUBLICATIONS

3GPP; Technical Specification Group Services and System Aspects; User data interworking, coexistence and migration (Release 16), No. V0.0.2, Apr. 4, 2019, pp. 1-75.
The Extended EP Search Report dated Nov. 25, 2020 for EP Patent Application No. 20181720.2, 10 pages.

* cited by examiner

SYSTEMS AND METHODS FOR NETWORK CATEGORIZATION

BACKGROUND

Advancements in cellular technology provide for the introduction of new types of cellular networks. These types of networks include 4th Generation (4G), 4G Long-Term-Evolution (LTE), and a new 5th Generation (5G) network, as well as others. Newer generations of networks aim to provide increased performance or capabilities over prior networks. For example, the new 5G network aims to provide increased data services, allowing users to download or stream movies and other media content at faster rates than current 4G or 4G LTE networks.

However, due to the costs associated with the equipment necessary to operate new network designs, as well as the cost of the user equipment purchased by users of the networks, there will often be more than one type of network servicing an area. For example, it is not uncommon to find mobile network operators operating 3rd Generation (3G), 4G, and LTE networks in the same area. With the advent of 5G, the trend of maintaining the operation of legacy networks is expected to continue, with the LTE networks supporting voice communications and the 5G networks supporting most of the data communications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
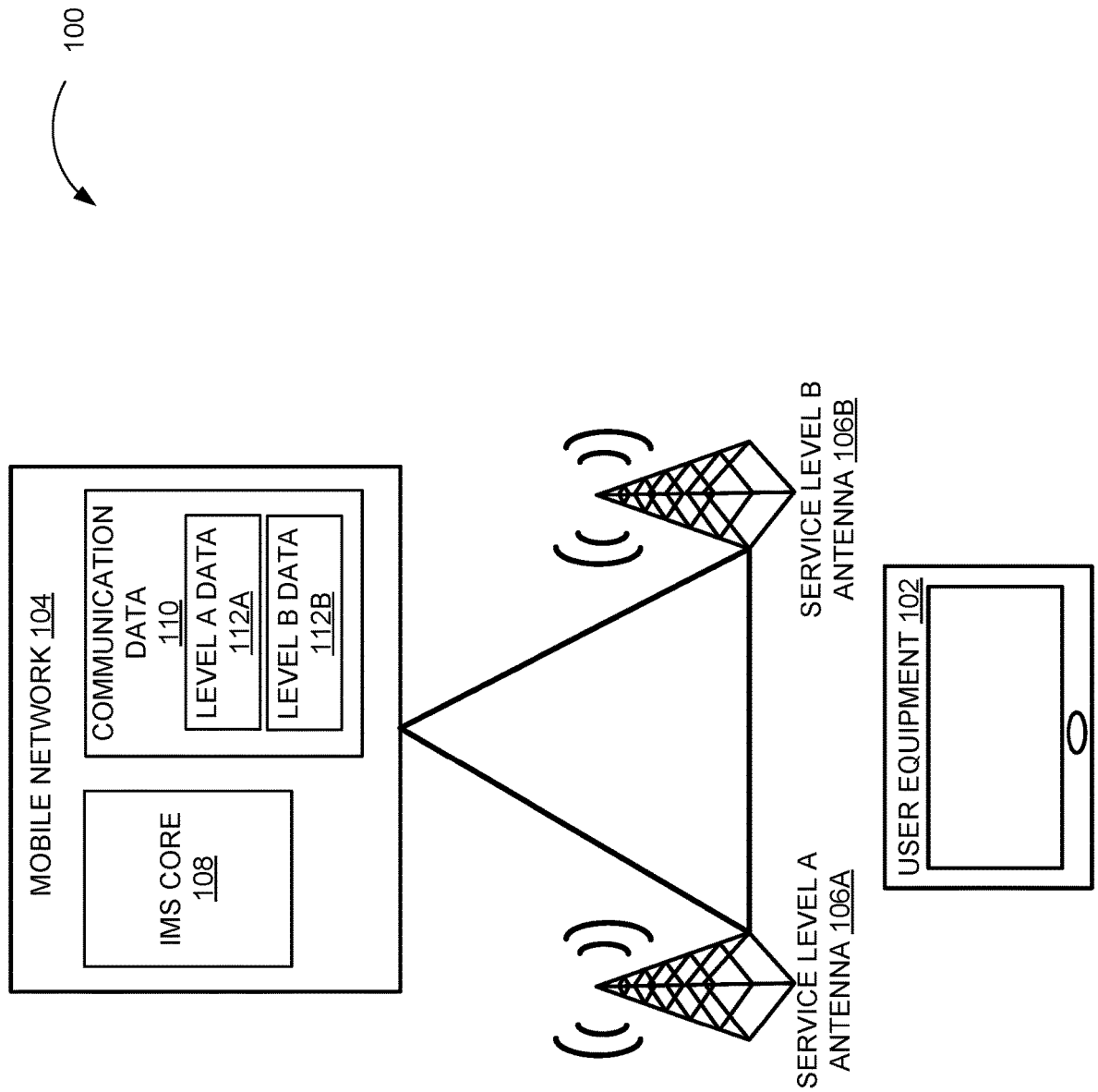
FIG. 1 depicts a system for providing network categorization, in accordance with some examples of the present disclosure.

Examples of the present disclosure can comprise systems and methods for providing network categorization of communication data. In networks with both LTE and 5G base stations, 5G-capable devices can camp on both the LTE and 5G base station. In some examples, the LTE base station may handle voice calls and other minor, non-data intensive services like instant messaging, while the 5G base station may handle data communications (such as Internet browsing, music and video streaming, and the like). During the registration of the device on the mobile network, the device may initially register (or "camp") on the LTE base station and, thereafter, register on the 5G base station for 5G services. Because of the registration process, the LTE base station and 5G base station operate in a master/secondary relationship, with the LTE base station acting as the master.

An issue with this setup is that the device may not be identified by the Internet Protocol Multimedia Subsystem (IMS) core of the mobile network as a 5G-capable device, effectively acting as a "blind spot" for the IMS core. Customers will be able to use 5G capabilities, but the IMS core will not know to label data relating to the 5G services as 5G communication data. The 5G communication data, used to, among other things, optimize and troubleshoot the network, will be stored in the same manner as the 4G or 4G LTE data. Thus, if there are issues in the 5G network, the network operator would not have the ability to easily or readily separate information (data) relating to the data communications using 5G from other information (data) relating to voice calls over 4G or 4G LTE, for example. Further, without identifying data as 5G data, the network operator may not become aware of potential issues, as the data may not be able to be monitored in real time.

In some examples of the presently disclosed subject matter, data associated with 5G data communications are sometimes referred to herein as a second service level service as opposed to a voice call on the LTE network, which may be referred to herein as a first service level. To perform the identification and labeling (categorization), the device's identity as a 5G-capable device is established with the network during the initial registration of the device. "Device" and "user equipment" are used interchangeably herein.

During the registration of the device, a notification is received that the device is 5G-capable. This notification may be received in various manners. For example, the device may have software or hardware installed that, when the registration process occurs, identifies the device as a 5G-capable device. In other examples, the notification is received when the mobile network receives the International Mobile Equipment Identity (IMEI), or another identifier, from the device, accesses a 5G-capable device database, and determines that the device is a 5G-capable device. A still further example may be that the device is identified as a 5G-capable device when the device is initially subscribed (a new user subscription) onto the mobile network. The presently disclosed subject matter is not limited to any particular manner in which a notification that the device is 5G-capable is generated and received. The notification allows the network services to label and identify communication data associated with the 5G-capable device in a special manner that allows for easier retrieval and review of the communication data.

The systems and methods discussed herein are discussed generally with respect to cellular UEs, tablets, computers, and the like, and in terms of components (e.g., network entities) associated with Wi-Fi networks, Bluetooth networks, wired networks, fourth-generation (4G) and fifth-generation (5G) cellular networks, and other types of networks. The systems and methods can be used with other types of equipment and on other types of networks, however, where users may wish to have increased flexibility in sending and receiving calls, video calls, and messages. Thus, the systems and methods described herein are described in terms of the 4G, 4G LTE, and 5G networks merely because these networks represent the state of the current art. One of skill in the art will recognize, however, the systems and methods could also be used on other networks that provide video calling such as, for example, Internet of Things (IoT), machine-to-machine (M2M), sixth-generation (6G), and other current and future networks.

As shown in FIG. 1, examples of the present disclosure can comprise a system 100 to provide network categorization of communication data. The system 100 includes a user equipment (UE) 102. The UE 102 is used by a user to access and use the services of a mobile network 104. The mobile network 104 provides 4G LTE network services using a service level A antenna 106A and 5G network services using a service level B antenna 106B. If providing 5G services, the service level B antenna 106B may be called a New Radio (NR). As used herein, the service level A antenna 106A and the service level B antenna 106B may be called or act as a "base station." It should be understood that the network 104 may have a significant number of service level A antennae and service level B antennae to provide network coverage over an area, such as a country or continent. The illustration of one service level A antennae and service level B antennae is merely to illustrate communications from the user equipment 102 to the mobile network 104.

The user equipment 102, if 5G-capable, may have dual antennae (not shown). One antenna will communicatively connect the user equipment 102 to the service level A antenna 106A. The other antenna will communicatively connect the user equipment 102 to the service level B antenna 106A. Thus, during use, the user equipment 102 will have a dual radio connection, one radio connection to the service level A antenna 106A and one radio connection to the service level B antenna 106B. For voice communications, as well as other light data uses such as instant messaging in some instances, the user equipment 102 will communicate with the mobile network 104 through the service level A antenna 106A that is providing 4G or 4G LTE services. For data-intensive communications, such as video streaming and media downloads, the user equipment 102 will communicate with the mobile network 104 through the service level B antenna 106B that is providing 5G services. In some examples, this arrangement (using both LTE and 5G antennae) is called a non-standalone (NSA) network.

When the user equipment 102 registers on the mobile network 104, as an NSA network, the user equipment 102 may first register on the mobile network 104 using the service level A antenna 106A. In a conventional NSA network, once the user equipment 102 is registered with the mobile network 104, if there is 5G network coverage, the mobile network 104 will instruct the user equipment 102 to establish a second bearer (secondary cell group or "SCG") with the service level B antenna 106B, establishing dual connectivity.

As mentioned above, the service level A antenna 106A is the master node and the service level B antenna 106B is the secondary node. Both the service level A antenna 106A and the service level B antenna 106B have a direct interface with the mobile network 104, which may be an Evolved Packet Core (EPC) network, in a user plane that carries the user data, but only the service level A antenna 106A has the direct interface towards the mobile network 104 in a control plane that carries the signaling traffic between the user equipment 102 and the mobile network 104. Thus, the service level A antenna 106A is responsible for maintaining the connection state transitions, handling the connection setup/release, and initiating the first-time service level B antenna 106B addition.

During the registration of the user equipment 102 on the mobile network 104, the user equipment 102 will be registered with an Internet Protocol Multimedia Subsystem (IMS) core 108. The IMS core 108 handles session management and media control. The IMS core 108 registration is an independent process that will be triggered from the user equipment 102 stack over Session Initiation Protocol (SIP).

During the registration of the user equipment 102 with the IMS core 108, to cause the IMS core network 108 to store communication data as 5G data rather than convention 4G or 4G LTE, the user equipment 102 is identified to the IMS core 108 as a 5G-capable device. In one example, the SIP registration message includes a P-Access-Network-Information (PANI) header. The PANI header is typically formatted according to 3GPP guidelines. In the present example, the PANI header is modified. The PANI header typically includes a cell global identity (CGI) with a prefix such as "3GPP-E-UTRAN". Cell Global Identity (CGI) is a globally unique identifier for a Base Transceiver Station in mobile phone networks. It consists of four parts: Mobile Country Code (MCC), Mobile Network Code (MNC), Location Area Code (LAC) and Cell Identification (CI).

In some examples of the presently disclosed subject matter, to provide notification to the IMS core 108 that the user equipment 102 is a 5G-capable device, the PANI header is modified to include additional information that, when received by the IMS core 108, the IMS core 108 will store communication data 110 of the user equipment 102 not as level A data 112A, but rather, as level B data 112B. In this manner, the mobile network 104 can monitor the level B data 112B to more readily identify issues, optimize the 5G services, and provide a better user experience.

The PANI header can be modified in various ways. For example, the PANI header can be modified from "3GPP-E-UTRAN" to "3GPP-E-UTRAN-5G". When the IMS core 108 receives the modified PANI header, it will direct the mobile network 104 to store the communication data 110 as service level B data 112B. Other ways to modify the registration process to cause the mobile network 104 to store the communication data 110 as service level B data 112B are possible and are considered to be within the scope of the presently disclosed subject matter.

Figure 2:
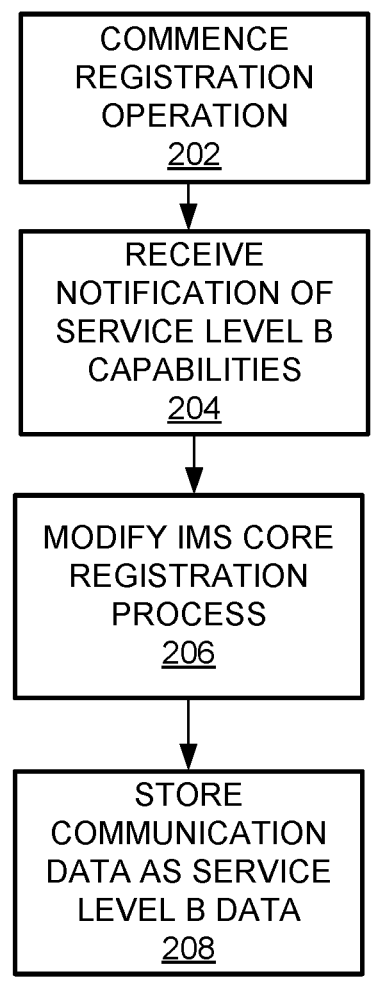
FIG. 2 is an illustrative process for providing network categorization, in accordance with some examples of the present disclosure.

FIG. 2 is an illustrative process 200 for categorizing network communication data. The process 200 and other processes described herein are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 2, the process 200 commences at operation 202, where the user equipment 102 is registered on the mobile network 104. In an NSA network, the user equipment 102 will camp on the service level A antenna 106A. In an NSA network, the service level A antenna 106A has the direct interface towards the mobile network 104 in a control plane that carries signaling traffic between the user equipment 102 and the mobile network 104. Thus, the service level A antenna 106A is responsible for maintaining the connection state transitions, handling the connection setup/release, and initiating the first-time service level B antenna 106B addition.

At operation 204, the mobile network 104 receives a notification that the user equipment 102 is capable of providing 5G services and will use the service level B antenna 106B for 5G services. This notification may be received in various manners. For example, the user equipment 102 may have software or hardware installed that, when the registration process 202 commences, the software or hardware on the user equipment 102 identifies the user equipment 102 as a 5G-capable device. In other examples, the notification is received when the mobile network 104 receives the International Mobile Equipment Identity (IMEI), or another identifier, from the user equipment 102, accesses a 5G-capable device database, and determines that the user equipment 102 is a 5G-capable device. A still further example may be that the user equipment 102 is identified as a 5G-capable device when the user equipment is initially subscribed (a new user subscription) onto the mobile network. A subscriber identity module (SIM) used with the user equipment 102 may be modified to indicate a 5G-capable device. The presently disclosed subject matter is not limited to any particular manner in which a notification that the user equipment 102 is 5G-capable is generated and received.

At operation 206, the IMS core 108 registration operation is modified to allow the IMS core 108 to label and identify communication data 110 associated with the 5G-capable user equipment 102 in a special manner that allows for easier retrieval and review of the communication data 110. In one example, the PANI header is modified from "3GPP-E-UTRAN" to "3GPP-E-UTRAN-5G". When the IMS core 108 receives the modified PANI header, it will direct the mobile network 104 to store the communication data 110 as service level B data 112B. Other ways to modify the registration process to cause the mobile network 104 to store the communication data 110 as service level B data 112B are possible and are considered to be within the scope of the presently disclosed subject matter.

At operation 208, once registered with the IMS core 108, if the user equipment 102 uses the service level B antenna 106B for 5G services, the communication data 110 associated with the user device 102 will be stored as level B data 112B rather than level A data 112A. The process 200 thereafter ends.

Figure 3:
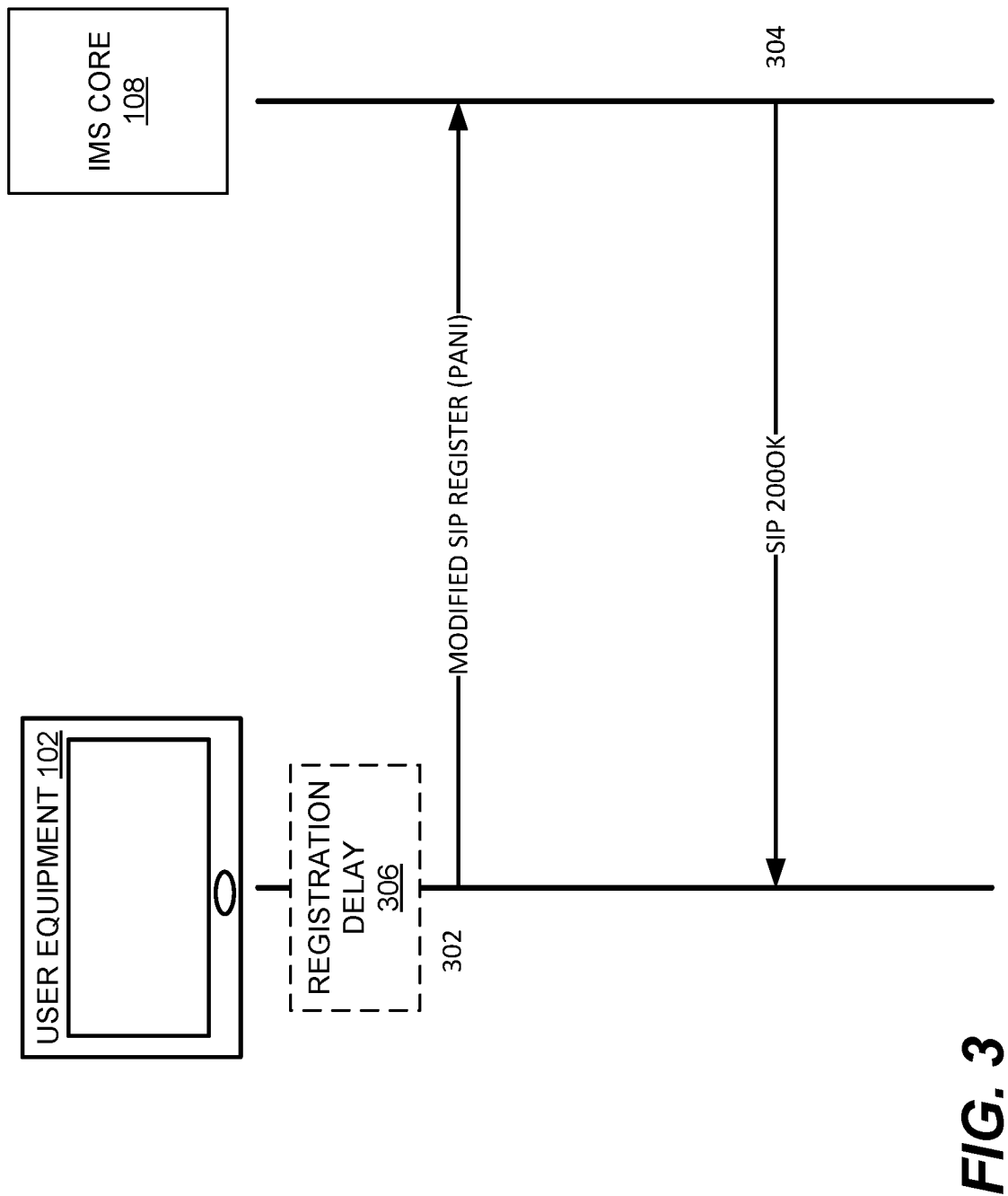
FIG. 3 is an illustrative IMS core registration process, in accordance with some examples of the present disclosure.

FIG. 3 is an example call flow for registering the user equipment 102 with the IMS core 108. The IMS core 108 is an architectural framework defined by the 3rd Generation Partnership Project (3GPP) for delivering Internet Protocol (IP) multimedia to a UE, such as the UE 102. The IMS core 108 can be maintained and/or operated by one or more service providers, such as one or more wireless carriers ("carriers"), that provide IMS-based services to users who are associated with UEs, such as the UE 102. For example, a service provider can offer multimedia telephony services that allow a user to call or message other users via the IMS core 108 using his/her UE. An operator of the IMS core 108 can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (e.g., a voice-based communication session, such as a VoLTE call, or a Wi-Fi call).

The communication data 110 associated with the IMS core 108 can be stored, monitored, and analyzed to detect fault conditions, optimize the network, and to troubleshoot issues with the mobile network 104. However, as noted above, if the communication data 110 associated with the mobile network 104 is not identified as 5G data, because of the nature of an NSA network, the communication data 110 will be stored as level A data 112A. To categorize the 5G communication data 110 as 5G data, the registration process of the user equipment 102 with the IMS core 108 will be modified.

At 302, the user equipment 102 transmits a modified SIP register message. In conventional systems, the SIP register message will include, among other information, a PANI header in the form of "3GPP-E-UTRAN" or similar headers as proscribed by the 3GPP protocol. In the presently disclosed subject matter, at 302, a modified SIP register message is communicated to the IMS core 108. In some examples, the PANI header is modified from "3GPP-E-UTRAN" to "3GPP-E-UTRAN-5G". W to "3GPP-E-UTRAN-5G". Thus, the IMS core 108 registers the user equipment 102 as a 5G-capable device rather than a 4G or 4G LTE device.

At 304, a SIP 2000K message is communicated from the IMS core 108 to the user equipment 102. Thus, when communication data 110 is received from the user equipment 102 when using the service level B antenna 106B for 5G services, the communication data 110 will be stored as level B data 112B (5G) rather than level A data 112A (4G or 4G LTE).

In some examples, it may be beneficial for the registration process of FIG. 3 to be delayed. For example, if the registration process of FIG. 3 occurs too quickly, by the time the mobile network 104 becomes aware that the user equipment 102 is capable of using 5G services and that 5G coverage is available, the user equipment 102 may already be registered with the IMS core 108 as a 4G or 4G LTE device. If this occurs, when the communication data 110 is stored, the communication data 110 will be stored as level A data 112A rather than level B data 112B. If there is an issue with 5G services for the user equipment 102 in this situation, it may be difficult to determine the issue since the communication data 110 is intermixed with the level A data 112A.

To try to prevent the inadvertent or undesired IMS core registration as a 4G or 4G LTE device when the device is 5G-capable and 5G services are available, the modified SIP register message at 302 may be delayed by a registration delay 306 of a period of time prior to the transmission of the modified SIP register message at 302. The registration delay 306 can range from milliseconds to minutes (though a shorter time is preferable to allow the user equipment 102 to use the services of the IMS core 108 more quickly). During the delay, the mobile network 104 or other service can wait to see if 5G coverage is available and usable.

In some examples, the registration delay 306 ranges from one second to four seconds, and more preferably, from two seconds to three seconds. If at the end of the registration delay 306 no information is received that the user equipment 102 is 5G-capable or that the service level B antenna 106B is available to provide 5G services, the registration operation of the user equipment 102 on the IMS core 108 proceeds with a conventional SIP register message at 302 rather than a modified SIP register message.

Figure 4:
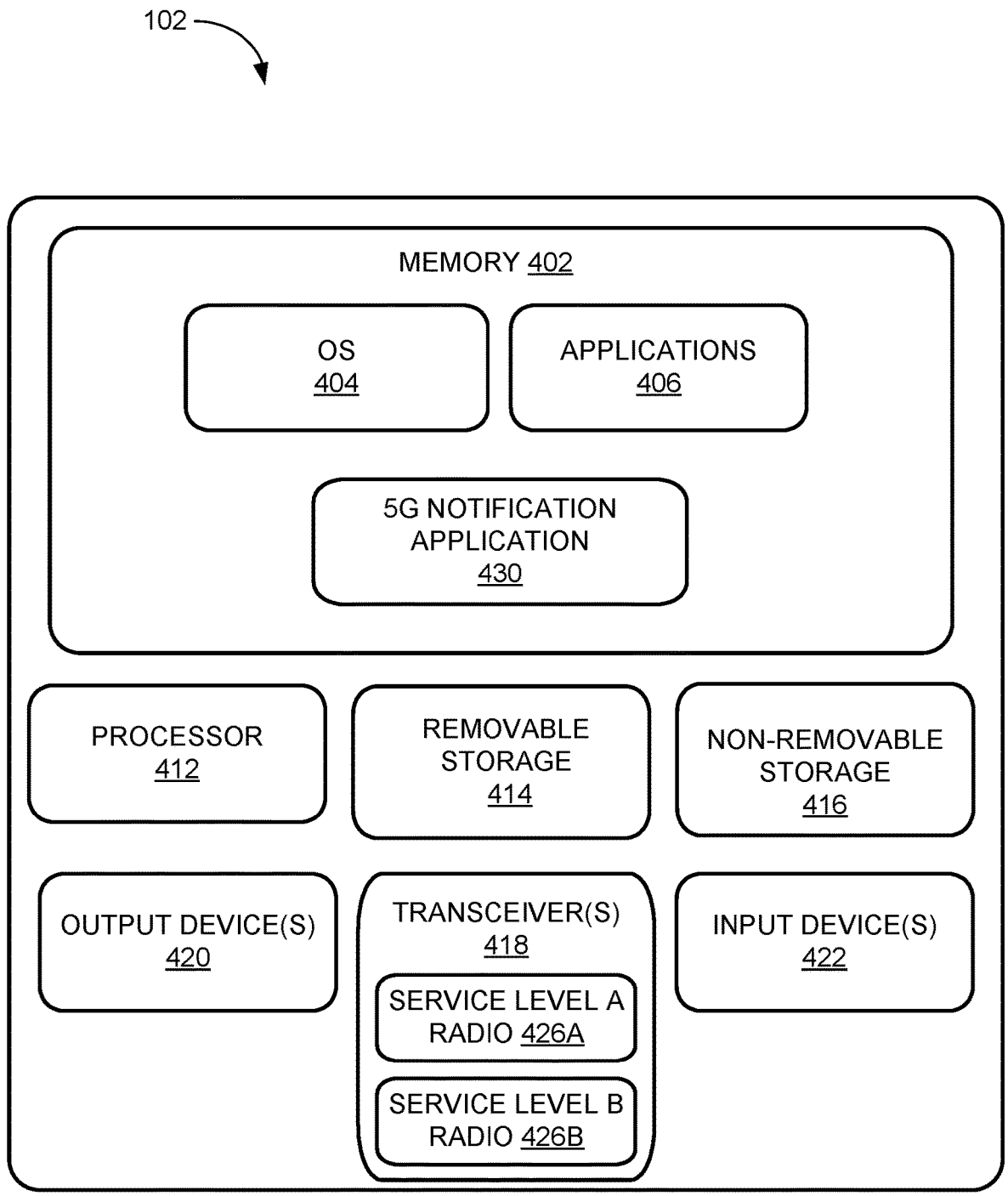
FIG. 4 depicts a component level view of a user equipment for use with the systems and methods described herein.

FIG. 4 depicts a component level view of the user equipment 102 for use with the systems and methods described herein. The user equipment 102 can comprise several components to execute the above-mentioned functions. As discussed below, the user equipment 102 can comprise memory 402 including an operating system (OS) 404 and one or more standard applications 406. The standard applications 406 can include many features common to user equipment such as, for example, applications initiated using voice commands (such as Internet searches, home appliance controls, and the like), music player, Internet radio, and other such applications. In this case, the standard applications 406 can also comprise a video call application, an audio call application, and a messaging application to enable users to engage in audio calls, video calls, and messaging, among other things. The standard applications 406 can also include contacts to enable the user to select a contact to initiate, for example, a video call, audio call, text message, etc.

The user equipment 102 can also comprise the 5G notification application 430. The 5G notification application 430 can be a background operation or hardware device that provides information to the mobile network 104 that the user equipment 102 is a 5G-capable device. As noted above, there may be other technologies or processes that may be used to identify the user equipment 102 as a 5G-capable device. The 5G notification application 430 is used by way of example. In some examples, the 5G notification application 430 operates in the background of the user equipment 102, but other configurations are possible and are considered to be within the scope of the presently disclosed subject matter.

The user equipment 102 can also comprise one or more processors 412 and one or more of removable storage 414, non-removable storage 416, transceiver(s) 418, output device(s) 420, and input device(s) 422. In various implementations, the memory 402 can be volatile (such as random access memory (RAM)), non-volatile (such as read only memory (ROM), flash memory, etc.), or some combination of the two. The memory 402 can include all, or part, of the 5G notification application 430.

The memory 402 can also include the OS 404. The OS 404 varies depending on the manufacturer of the user equipment 102. The OS 404 contains the modules and software that support basic functions of the user equipment 102, such as scheduling tasks, executing applications, and controlling peripherals. In some examples, the OS 404 can enable the 5G notification application 430, and provide other functions, as described above, via the transceiver(s) 418.

The UE 102 can also comprise one or more processors 412. In some implementations, the processor(s) 412 can be a central processing unit (CPU), a graphics processing unit (GPU), both CPU and GPU, or any other processing unit. The user equipment 102 may also include additional data storage devices (removable and/or non-removable) such as, for example, magnetic disks, optical disks, or tape. Such additional storage is illustrated in FIG. 4 by removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. The memory 402, removable storage 414, and non-removable storage 416 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the user equipment 102. Any such non-transitory computer-readable media may be part of the user equipment 102 or may be a separate database, databank, remote server, or cloud-based server.

In some implementations, the transceiver(s) 418 include any transceivers known in the art. In some examples, the transceiver(s) 418 can include wireless modem(s) to facilitate wireless connectivity with other components (e.g., between the user equipment 102 and a wireless modem that is a gateway to the Internet), the Internet, and/or an intranet. Specifically, the transceiver(s) 418 can include one or more transceivers that can enable the user equipment 102 to send and receive video calls, audio calls, and messages and to perform other functions. Thus, the transceiver(s) 418 can include multiple single-channel transceivers or a multi-frequency, multi-channel transceiver to enable the user equipment 102 to send and receive video calls, audio calls, messaging, etc. The transceiver(s) 418 can include a service level A radio 426A and a service level B radio 426B. The transceiver(s) 418 can enable the user equipment 102 to connect to multiple networks including, but not limited to 2G, 3G, 4G, 4G LTE, 5G, and Wi-Fi networks. The transceiver(s) can also include one or more transceivers to enable the user equipment 102 to connect to future (e.g., 6G) networks, Internet-of-Things (IoT), machine-to machine (M2M), and other current and future networks.

The transceiver(s) 418 may also include one or more radio transceivers that perform the function of transmitting and receiving radio frequency communications via an antenna (e.g., Wi-Fi or Bluetooth®). In other examples, the transceiver(s) 418 may include wired communication components, such as a wired modem or Ethernet port, for communicating via one or more wired networks. The transceiver(s) 418 can enable the user equipment 102 to make audio and video calls, download files, access web applications, and provide other communications associated with the systems and methods, described above.

In some implementations, the output device(s) 420 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen, or display, on which the GUI 410 can be displayed. The output device(s) 420 can also include speakers, or similar devices, to play sounds or ringtones when an audio call or video call is received. Output device(s) 420 can also include ports for one or more peripheral devices, such as headphones, peripheral speakers, or a peripheral display.

In various implementations, input device(s) 422 include any input devices known in the art. For example, the input device(s) 422 may include a camera, a microphone, or a keyboard/keypad. The input device(s) 422 can include a touch-sensitive display or a keyboard to enable users to enter data and make requests and receive responses via web applications (e.g., in a web browser), make audio and video calls, and use the standard applications 406, among other things. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can be used to display the GUI 410, for example, and to act as both an input device 422 and an output device 420.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A computer-implemented method, comprising:
commencing a registration operation of a user equipment on first base station of a mobile network at a first service level;
receiving a notification from the user equipment that the user equipment is capable of using the first service level on the first base station and a second service level on a second base station of the mobile network, the first base station and second base station having a master-secondary relationship and the notification comprising a modified SIP registration message including a flag indicating a second service level capability; and
in response to receiving the notification, configuring an Internet Protocol Multimedia Subsystem (IMS) core of the mobile network to store communication data associated with an operation of the user equipment on the mobile network as level B data when the operation utilizes the second service level and as level A data when the operation utilizes the first service level.

2. The method of claim 1, wherein receiving the notification that the user equipment is capable of using the first service level and the second service level comprises receiving the modified SIP registration message during a registration operation of the user equipment on the IMS core.

3. The method of claim 2, wherein the modified SIP registration message comprises a modified P-Access-Network-Information (PANI) header.

4. The method of claim 3, wherein the modified PANI header includes the flag to indicate the second service level capability.

5. The method of claim 1, wherein the first service level is Long-Term Evolution cellular technology and the second service level is fifth generation (5G) cellular technology.

6. The method of claim 1, wherein commencing the registration operation of the user equipment on the mobile network at the first service level comprises an IMS core registration delay of a period of time to allow the mobile network to receive information that the second service level is available and that the user equipment is capable of using the second service level.

7. The method of claim 6, further comprising:
determining that the period of time has elapsed; and
continuing the IMS core registration without configuring the IMS core of the mobile network to store the communication data.

8. A system comprising:
a memory storing computer-executable instructions; and
a processor in communication with the memory, the computer-executable instructions causing the processor to perform acts comprising:
commencing a registration operation of a user equipment on a first base station of a mobile network at a first service level;
receiving a notification from the user equipment that the user equipment is capable of using the first service level on the first base station and a second service level on a second base station of the mobile network, the first base station and second base station having a master-secondary relationship and the notification comprising a modified registration message including a flag indicating a second service level capability; and
configuring an Internet Protocol Multimedia Subsystem (IMS) core of the mobile network to store communication data associated with an operation of the user equipment on the mobile network as level B data when the operation utilizes the second service level and as level A data when the operation utilizes the first service level.

9. The system of claim 8, wherein receiving the notification that the user equipment is capable of using the first service level and a second service level comprises receiving the modified registration message during the registration operation.

10. The system of claim 9, wherein the modified registration message comprises a modified P-Access-Network-Information (PANI) header.

11. The system of claim 10, wherein the modified PANI header includes the flag to indicate the second service level capability.

12. The system of claim 8, wherein the first service level is Long-Term Evolution cellular technology and the second service level is fifth generation (5G) cellular technology.

13. The system of claim 8, wherein the first base station comprises a Long-Term Evolution base station and the second base station comprises a New Radio (NR) base station.

14. The system of claim 13, wherein the user equipment is associated with the LTE base station for voice communications and the NR base station for data communications.

15. A non-transitory computer-readable storage medium having computer-executable instructions stored thereupon that, when executed by a computer, cause the computer to perform act comprising:
commencing a registration operation of a user equipment on a first base station of a mobile network at a first service level;
receiving a notification that the user equipment is capable of using the first service level on the first base station and a second service level on a second base station of the mobile network, the first base station and second base station having a master-secondary relationship and the notification comprising a modified SIP registration message including a header reading 3GPP-EUTRAN-5G; and
in response to receiving the notification, configuring an Internet Protocol Multimedia Subsystem (IMS) core of the mobile network to store communication data associated with an operation of the user equipment on the mobile network as level B data when the operation utilizes the second service level and as level A data when the operation utilizes the first service level.

16. The non-transitory computer-readable storage medium of claim 15, wherein receiving a notification that the user equipment is capable of using the first service level and the second service level comprises receiving the modified SIP registration message during a registration operation of the user equipment on the IMS core.

17. The non-transitory computer-readable storage medium of claim 16, wherein the modified SIP registration message comprises a modified P-Access-Network-Information (PANI) header.

18. The non-transitory computer-readable storage medium of claim 17, wherein the modified PANI header includes a flag to indicate a second service level capability.

19. The non-transitory computer-readable storage medium of claim 15, wherein the first service level is Long-Term Evolution cellular technology and the second service level is fifth generation (5G) cellular technology.

20. The non-transitory computer-readable storage medium of claim 15, wherein commencing the registration operation of the user equipment on the mobile network at the first service level comprises an IMS core registration delay of a period of time to allow the mobile network to receive information that the second service level is available and that the user equipment is capable of using the second service level.

\* \* \* \* \*